(12) United States Patent
Wu

(10) Patent No.: US 10,845,652 B2
(45) Date of Patent: Nov. 24, 2020

(54) DISPLAY PANEL HAVING RETAINING WALL AND DISPLAY DEVICE HAVING THE SAME

(71) Applicant: HKC Corporation Limited, Guangdong (CN)

(72) Inventor: Chuan Wu, Guangdong (CN)

(73) Assignee: HKC Corporation Limited, Shenzhen (CN)

( * ) Notice: Subject to any disclaimer, the term of this patent is extended or adjusted under 35 U.S.C. 154(b) by 23 days.

(21) Appl. No.: 16/256,084

(22) Filed: Jan. 24, 2019

(65) Prior Publication Data
US 2020/0183213 A1 Jun. 11, 2020

Related U.S. Application Data

(63) Continuation of application No. PCT/CN2018/122088, filed on Dec. 19, 2018.

(30) Foreign Application Priority Data

Dec. 5, 2018 (CN) .................... 2018 2 2035652 U

(51) Int. Cl.
*G02F 1/1339* (2006.01)
*G02F 1/1337* (2006.01)

(52) U.S. Cl.
CPC .... *G02F 1/13394* (2013.01); *G02F 1/133723* (2013.01); *G02F 2001/13398* (2013.01)

(58) Field of Classification Search
CPC ........... G02F 1/13394; G02F 1/133723; G02F 2001/13398; G02F 1/1339; G02F 1/1337; G02F 1/133707; G02F 2001/133388; G02F 1/134309; G02F 2001/13396; G02F 1/133351; G02F 2001/133776; G02F 1/1333; C09K 19/56
See application file for complete search history.

(56) References Cited

U.S. PATENT DOCUMENTS

| 2013/0258234 | A1* | 10/2013 | Park | G02F 1/133512 349/58 |
| 2015/0168752 | A1* | 6/2015 | Shih | G02F 1/1368 349/123 |
| 2016/0154261 | A1* | 6/2016 | Kim | G02F 1/133351 349/61 |
| 2017/0205647 | A1* | 7/2017 | Feng | G02F 1/133514 |
| 2020/0081301 | A1* | 3/2020 | Yang | G02F 1/133723 |

* cited by examiner

*Primary Examiner* — Huyen L Ngo

(57) ABSTRACT

The application discloses a display panel and a display device. The display panel comprises a substrate comprising an active area and a non-display area surrounding the active area; an alignment film arranged in the active area; a sealant arranged in the non-display area; and at least one row of retaining wall arranged between the alignment film and the sealant, and the retaining wall comprises a plurality of sections of sub-retaining walls which are arranged at intervals to form protrusions and depressions.

19 Claims, 3 Drawing Sheets

DISPLAY PANEL HAVING RETAINING WALL AND DISPLAY DEVICE HAVING THE SAME

CROSS REFERENCE TO RELATED APPLICATIONS

This application is a Continuation Application of PCT Application No. PCT/CN2018/122088 filed on Dec. 19, 2018, which claims the benefit of Chinese patent application No. 201822035652.5 titled "DISPLAY PANEL AND DISPLAY DEVICE" applied on Dec. 5, 2018, the disclosure of which is incorporated herein by reference in its entirety.

FIELD OF THE DISCLOSURE

The present application relates to the technical field of display panel packaging, in particular to a display panel and a display device using the display panel.

BACKGROUND OF THE DISCLOSURE

The statements herein merely provide background information related to the present application and do not necessarily constitute prior art.

A liquid crystal display comprises an upper substrate and a lower substrate which are oppositely arranged, wherein the upper substrate mainly consists of a matrix composed of red, green and blue color resistors and indium tin oxide (ITO) serving as a common electrode, and the lower substrate is provided with a matrix composed of metal wires and crystal diodes. Liquid crystal is sandwiched between the two opposite substrates, and the rotation of liquid crystal molecules is controlled by the pressure difference between ITO electrodes on the upper and lower substrates, thereby controlling the display brightness of a display panel. The upper substrate and the lower substrate are glued into a box by a sealant applied around one of the substrates.

At the initial stage of the manufacturing process, the liquid crystal molecules are in a disordered state and an alignment film is needed for initial orientation. The substrate has a display area and a non-display area. During the manufacturing of the alignment film, a liquid alignment film material needs to be coated on the display area of the substrate while being prevented from flowing to the sealant to affect the adhesion of the sealant and ultimately affect the sealing property of the upper and lower substrates. Therefore, exemplary arrangement generally involves a vertical retaining wall on the side, near the display area, of the sealant to prevent the liquid alignment film material from mixing with the sealant. However, while preventing the outflow of the liquid alignment film material, the vertical retaining wall also causes the liquid alignment film material to impact the retaining wall to generate backflow, so that abnormal display is caused on the peripheral edges of the display panel due to the lack of alignment film material at the edge of the substrate, as well as in the active area due to the backflow of the liquid alignment film material.

SUMMARY OF THE DISCLOSURE

The main purpose of the present application is to provide a display panel and a display device, aiming at preventing display abnormality of the display panel.

To achieve the above purpose, the display panel proposed by the present application comprises:

a substrate, comprising an active area and a non-display area surrounding the active area;

an alignment film, arranged in the active area;

a sealant, arranged in the non-display area; and at least one row of retaining wall, arranged between the alignment film and the sealant, the retaining wall comprising a plurality of sections of sub-retaining walls which are arranged at intervals to form protrusions and depressions.

In one embodiment of the present application, the protrusion comprises a transverse sub-retaining wall and two inclined sub-retaining walls, the transverse sub-retaining wall is arranged close to the alignment film, the two inclined sub-retaining walls are positioned on the side, facing the sealant, of the transverse sub-retaining wall, the two inclined sub-retaining walls are oppositely arranged in a spaced mode along the first direction of the transverse sub-retaining wall to form a receding gap, and the transverse sub-retaining wall is arranged in the receding gap; and the depression comprises a transverse sub-retaining wall and two inclined sub-retaining walls, the transverse sub-retaining wall is arranged close to the alignment film, the two inclined sub-retaining walls are positioned on the side, facing the sealant, of the transverse sub-retaining wall, the two inclined sub-retaining walls are oppositely arranged in a spaced mode along the first direction of the transverse sub-retaining wall to form a receding gap, and the transverse sub-retaining wall is arranged in the receding gap.

In one embodiment of the present application, the inclination directions of two adjacent inclined sub-retaining walls are opposite.

In one embodiment of the present application, a direction perpendicular to the first direction is defined as a second direction, and an included angle $\alpha$ formed by the inclined sub-retaining walls and the second direction is within the range of $0°\leq\alpha<90°$.

In one embodiment of the present application, the inclination angles of two adjacent inclined sub-retaining walls are the same.

In one embodiment of the present application, in the protrusions, the vertical distance H1 between the highest point of the inclined sub-retaining walls and the plane where the lower surface of the transverse sub-retaining wall is located is within the range of $0\ \mu m < H1 \leq 100\ \mu m$.

In one embodiment of the present application, in the depressions, the vertical distance H2 between the lowest point of the inclined sub-retaining walls and the plane where the upper surface of the transverse sub-retaining wall is located is within the range of $0\ \mu m < H2 \leq 100\ \mu m$.

In one embodiment of the present application, the length L1 of one of the sub-retaining walls ranges from 10 $\mu m$ to 500 $\mu m$.

In one embodiment of the present application, all the sub-retaining walls have the same length.

In one embodiment of the present application, the retaining wall is made from polystyrene.

In one embodiment of the present application, the alignment film is made from polyimide.

The present application further provides a display device comprising a display panel, and the display panel comprises:

a substrate, comprising an active area and a non-display area surrounding the active area;

an alignment film, arranged in the active area;

a sealant, arranged in the non-display area; and at least one row of retaining wall, arranged between the alignment film and the sealant, the retaining wall comprising a plurality of sections of sub-retaining walls which are arranged at intervals to form protrusions and depressions.

The present application further provides a display device comprising a display panel, and the display panel comprises:

a substrate, comprising an active area and a non-display area surrounding the active area, the substrate being at least one of an array substrate and a color film substrate;

an alignment film, arranged in the active area;

a sealant, arranged in the non-display area; and at least one row of retaining wall, arranged between the alignment film and the sealant, the retaining wall comprising a plurality of sections of sub-retaining walls which are arranged at intervals to form protrusions and depressions; and all the sub-retaining walls have the same length.

According to the technical solutions of the present application, by arranging the retaining wall between the alignment film and the sealant, alignment film liquid is prevented from making contact with the sealant. At the same time, by making the retaining wall consist of the plurality of sections of sub-retaining walls which are arranged to form the protrusions and the depressions, after flowing to the protrusions, the alignment film liquid then flows to the depressions through the sub-retaining walls beside the protrusions and converges at the depressions; in this way, the alignment film liquid does not flow back, so that the display of the active area is normal. Furthermore, the alignment film liquid will not come into contact with the sealant because of the blocking and convergence of the protrusions and the depressions. As a result, display abnormality of the display panel can be effectively prevented.

BRIEF DESCRIPTION OF THE DRAWINGS

In order to illustrate the technical solutions in the embodiments of the present application or in the exemplary art more clearly, the drawings which are required to be used in the description of the embodiments or the exemplary art are briefly described below. It is obvious that the drawings described below are only some embodiments of the present application. It is apparent to those of ordinary skill in the art that other drawings may be obtained based on the structures shown in accompanying drawings without inventive effort.

DESCRIPTION OF THE REFERENCE NUMERALS

Figure 1:
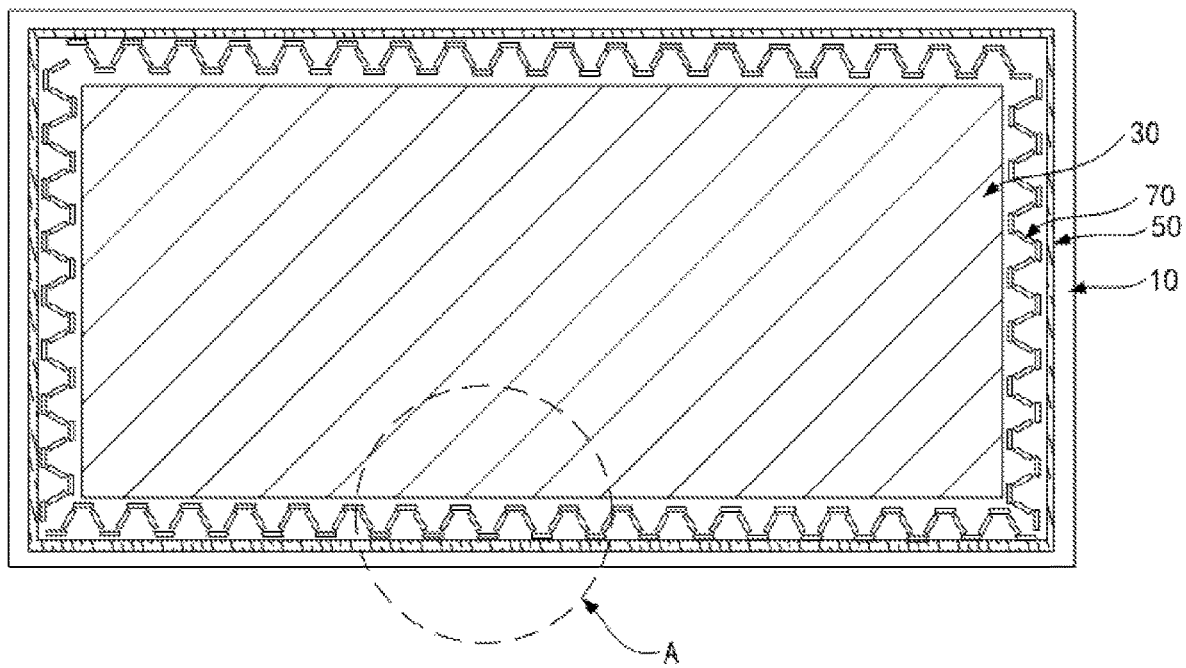
FIG. 1 is a structural view of an embodiment of a display panel of the present application.

| Reference numeral | Name |
|---|---|
| 100 | Display panel |
| 10 | Substrate |
| 30 | Alignment film |
| 50 | Sealant |
| 70 | Retaining wall |
| 71 | Protrusions |
| 73 | Depressions |
| 75 | Transverse sub-retaining wall |
| 77 | Inclined sub-retaining wall |

The object realization, function characteristics and advantages of this application will be further described in reference to embodiments and accompanying drawings.

DETAILED DESCRIPTION OF THE EMBODIMENTS

The technical solutions in the embodiments of the present application will be clearly and completely described hereafter in reference to the drawings in the embodiments of the present application. It is apparent that the described embodiments are merely a part of embodiments rather than all the embodiments of the present application. All the other embodiments obtained by the artisans concerned on the basis of the embodiments in the present application without creative efforts fall within the scope of claims of the present application.

It is to be understood that, all of the directional instructions in the exemplary embodiments of the present disclosure (such as top, down, left, right, front, back) can only be used for explaining relative position relations, moving condition of the elements under a special form (referring to figures), and so on, if the special form changes, the directional instructions changes accordingly.

In this application, unless otherwise stated or defined, the terms 'install', 'interconnect' and 'connect' should be understood from a broad extent. For instance, it may be connected in a fixed, removable or integrated manner; and it may be mechanically or electrically connected; and it may be directly or indirectly (via a media in between) connected; and it may be the inside of two elements in communication with each other or two elements interacting with each other. The ordinary artisans concerned may understand the specific meaning of terms in this application according to specific circumstance.

Besides, the descriptions, such as the "first", the "second" in the present application, are only used for descriptive purpose, and cannot be understood as indicating or suggesting relative importance or impliedly indicating the number of the indicated technical features. Therefore, the character indicated by the "first", the "second" can explicitly or implicitly include at least one feature. Additionally, the technical solution of each embodiment can be combined with each other on the condition that it can be realized by ordinary artisans concerned; if the combination of technical solution contradicts each other or cannot be realized, it should be regarded that the combination of such solution does not exist, nor is it in the protection scope required by the present application.

The present application discloses a display panel 100 which should be provided as a display device.

Figure 2:
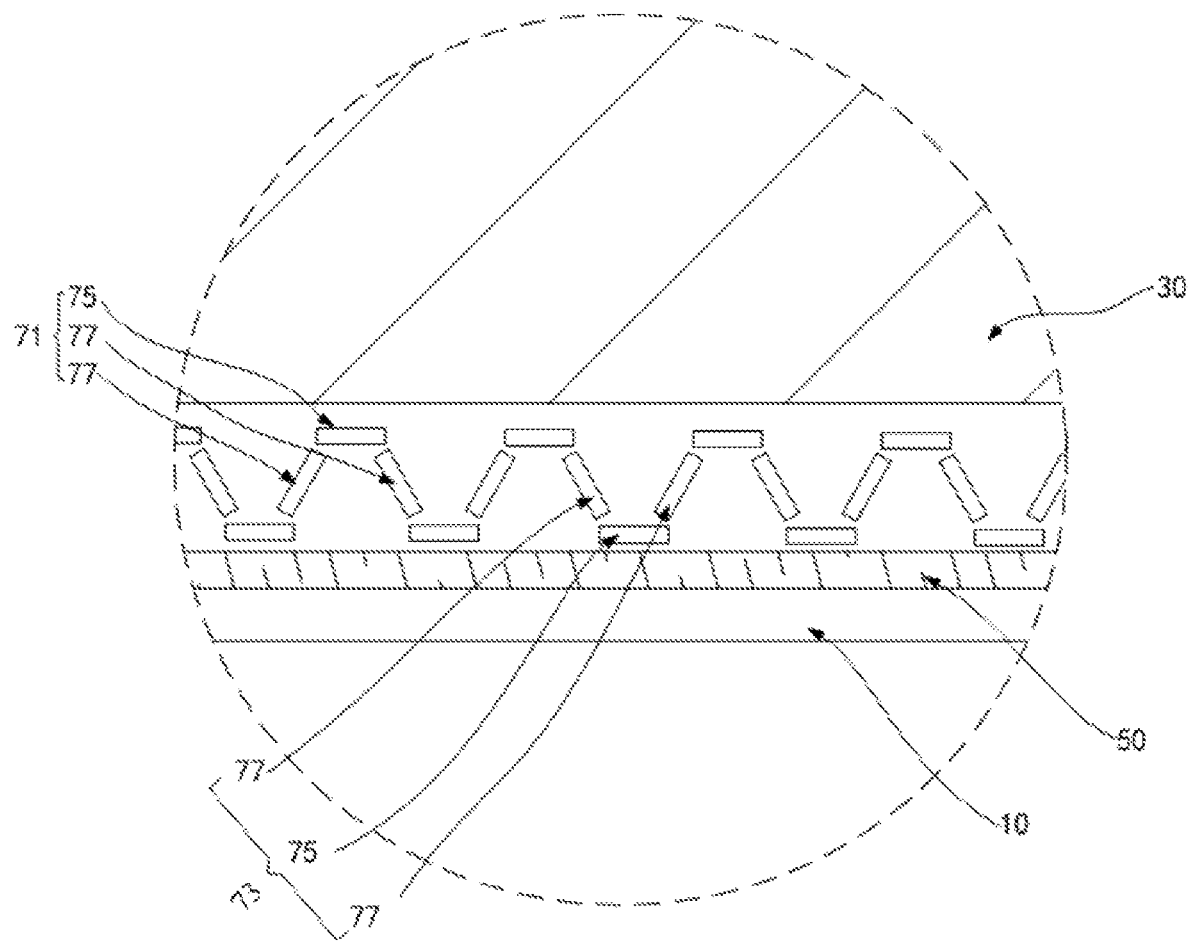
FIG. 2 is a partial enlarged view of A in FIG. 1.
Figure 3:
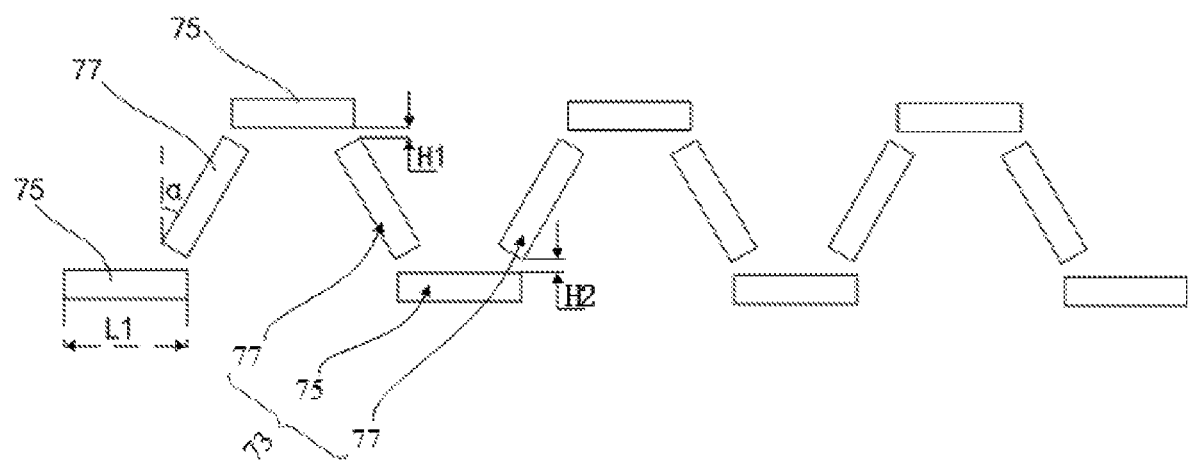
FIG. 3 is a layout view of an embodiment of a retaining wall of the present application.

Referring to FIG. 1 to FIG. 3, in the embodiment of the present application, the display panel 100 comprises:

a substrate 10, comprising an active area and a non-display area surrounding the active area;

wherein in one embodiment of the present application, the substrate 10 is at least one of an array substrate and a color film substrate, that is, the substrate 10 may be an upper substrate (color film substrate), the color film substrate is mainly composed of a matrix composed of red, green and blue colors and ITO as a common electrode, and the substrate 10 may also be a lower substrate (array substrate) having a matrix composed of metal wires and crystal diodes; the thickness of the substrate 10 of the present application can be set to 0.4 mm to 0.7 mm, thereby making the thickness of the substrate 10 thinner, further allowing the overall thickness of the display panel 100 to be thinner; the substrate 10 is made of a glass substrate, and substrate glass can be divided into two types: alkali glass and alkali-free glass; alkali glass includes sodium glass and neutral borosilicate glass, most of which should be set on Twisted Nematic (TN) and Super Twisted Nematic (STN LCD), and is mainly produced by floating process; most alkali-free glass is alkali-free alumino silicate glass, the main components of which are SiO2, Al2O3, B2O3 and BaO, and it has a total alkali metal content of less than 1% and is mainly set on TFT-LCD;

the active area refers to an area of the substrate 10 where character images can be displayed, and can be arranged in the middle area of the substrate 10; and the non-display area refers to an area where character images cannot be displayed, and is generally disposed around the active area, and circuit routing and other driven electronic components are disposed herein;

an alignment film 30, arranged in the active area;

wherein the alignment film 30 is a film having a straight strip scratch, and serves to guide the alignment direction of liquid crystal molecules; for example, on the glass substrate 10 which has been vaporized with a transparent conducting film (ITO), strips of parallel grooves are printed on the ITO film by using a PI masking liquid and a roller, and liquid crystal then can follow the direction of the grooves to lie in the grooves to achieve the purpose of aligning the liquid crystal in the same direction;

the material of the alignment film 30 needs to have good optical penetration, must be ionized or partially ionized, has a covalent or partially covalent link, is amorphous and has a good lattice structure;

the main inorganic materials used include DIAMOND-LIKE CARBON (DLC), DLC is a substance composed of carbon elements, similar in nature to diamonds, and also having a graphite atom composition structure, and DLC is an amorphous film with high hardness, high elastic modulus, low friction factor, high wear resistance and good vacuum tribological property, SiC, SiO2, glass, Si3N4, $Al_2O_3$, CeO2, ZnTiO2 etc; the main organic materials used include Polyimide (PI), Polyvinyl Chloride (PVC, main ingredient being polyvinyl chloride), and Polymethyl Methacrylate (PMMA, main ingredient being polymethyl methacrylate);

polyimide is optional for the present application, and polyimide refers to a type of polymer containing an imide ring (—CO—NH—CO—) in the chain backbone, among which it is of the most importance that the polymer contains a phthalimide structure; as a special engineering material, polyimide has been widely used in aviation, aerospace, microelectronics, nano, liquid crystal, separation membrane, laser and other fields; polyimide has the advantage that the initial decomposition temperature is generally around 500° C.; the polyimide synthesized from pyromellitic dianhydride and p-phenylenediamine has a thermal decomposition temperature of 600° C., and is one of the highest thermalstability of polymers in the prior art; polyimide can also withstand extremely low temperatures, such as in liquid helium at −269° C. without brittle fracture; polyimide has excellent mechanical properties, the tensile strength of unfilled plastic is above 100 Mpa, the film of polypyromellitimide (Kapton) is above 170 Mpa, and that of the biphenyl-polyimide (Upilex S) reaches 400 Mpa; as engineering plastics, the modulus of elasticity is usually 3-4 Gpa, and that of the fiber can reach 200 Gpa. According to theoretical calculation, the modulus of elasticity of the fiber synthesized by pyromellitic dianhydride and p-phenylenediamine can reach 500 Gpa, second only to that of the carbon fiber; some polyimides are insoluble in organic solvents and are stable to dilute acids. The general varieties are not anti-hydrolysis. This seemingly disadvantageous property makes polyimide have a very different feature from other high performance polymers, ie., raw materials of dianhydride and diamine can be recovered by alkaline hydrolysis, for example, for Kapton film, the recovery rate can reach 80%-90%; changing the structure can also result in a variety that is quite anti-hydrolysis, such as being subject to boiling at 120° C. for 500 hours; polyimide has high irradiation resistance, and the strength retention of its film is 90% after the fast electron irradiation of 5×109 rad; polyimide has good dielectric properties, and a dielectric constant of about 3.4. The dielectric constant can be reduced to about 2.5 if fluorine is drawn into, or the nanoscale of air is dispersed in polyimide; the dielectric loss is 10-3, the dielectric strength is 100-300 KV/mm, and the extensively formed thermoplastic polyimide is 300 KV/mm; these properties are maintained at a high level within a wide range of temperature and frequency; polyimide is a self-extinguishing polymer with a low fuming rate; the outgassing quantity of polyimide is quite little under extremely high vacuum; and polyimide is non-toxic and some polyimides also have good biocompatibility;

a sealant 50, arranged in the non-display area;

wherein the sealant 50 is an adhesive that bonds the upper and lower substrates 10 of a LCD screen while maintaining a certain gap, and then seals the injected liquid crystal so that it does not leak and prevents external contaminants from entering; the adhesive is the sealant 50, also known as the edge sealing sealant; there are two main types of sealant 50 for the LCD screen: thermocuring adhesive and ultraviolet (UV) curing adhesive; the main difference between the two types of adhesives is the way they are cured, and thermocuring adhesives are widely used; however, UV curing adhesive is superior to thermocuring adhesive in curing time, adhesion, moisture resistance and heat resistance and other aspects in production of the high-precision liquid crystal display; in particular, the curing time is short, which shortens the production cycle, and prevents the misalignment of the two sheets of glass during the long-term curing process; the UV curing adhesive is optional for the present application, and the composition is a denatured acrylate compound, and the appearance is a yellowish viscous liquid; and during work, the gel-like UV curing adhesive is uniformly applied to the frame of the upper glass surface, and the upper and lower substrates 10 are bonded, after which the ultraviolet light is irradiated to crosslink the adhesive from a linear macromolecular structure into a stable network structure which has a strong adhesion ability to bond the two sheets of substrates 10 together;

and at least one row of retaining wall 70, arranged between the alignment film 30 and the sealant 50, the retaining wall 70 comprising a plurality of sections of sub-retaining walls which are arranged at intervals to form protrusions 71 and depressions 73.

According to the technical solutions of the present application, by arranging the retaining wall 70 between the alignment film 30 and the sealant 50, alignment film 30 liquid is prevented from making contact with the sealant 50. At the same time, by making the retaining wall 70 consist of the plurality of sections of sub-retaining walls which are arranged to form the protrusions 71 and the depressions 73, after flowing to the protrusions 71, the alignment film 30 liquid then flows to the depressions 73 through the sub-retaining walls beside the protrusions 71 and converges at the depressions 73; in this way, the alignment film 30 liquid does not flow back, so that the display of the active area is normal. Furthermore, the alignment film 30 liquid will not come into contact with the sealant 50 because of the blocking and convergence of the protrusions 71 and the depressions 73. As a result, display abnormality of the display panel 100 can be effectively prevented.

The plurality of sections of sub-retaining walls can have the same or different shapes and structures. The sub-retaining walls can have a cuboid shape to facilitate processing. Other shapes are also possible, such as an arc-shaped structure or a wave-shaped structure. The arc-shaped structure may be a part of an arc, such as an inferior arc, and its center is located on one side of the active area, so that the arc-shaped structure can also be a storage space for containing the alignment film 30 film.

In one embodiment of the present application, in order to facilitate processing and design, the sub-retaining walls are designed to have the same length. Of course, in another embodiment of the present application, the sub-retaining walls may also be designed to have different lengths. In this way, differentiated design and arrangement of the sub-retaining walls can be realized.

In one embodiment of the present application, a plurality of rows of retaining walls 70 may also be provided, each row of retaining wall 70 is provided with protrusions 71 and depressions 73, the protrusions 71 of two adjacent rows of retaining walls 70 are correspondingly arranged, the depressions 73 of two adjacent rows of retaining walls 70 are correspondingly arranged, and the arrangement of the plurality of rows of retaining walls 70 can better block the alignment film 30 liquid and prevent the backflow of the alignment film 30 liquid.

Referring to FIG. 2 and FIG. 3, in one embodiment of the present application, the protrusion 71 comprises a transverse sub-retaining wall 75 and two inclined sub-retaining walls 77, the transverse sub-retaining wall 75 is arranged close to the alignment film 30, the two inclined sub-retaining walls 77 are positioned on the side, facing the sealant 50, of the transverse sub-retaining wall 75, the two inclined sub-retaining walls 77 are oppositely arranged in a spaced mode along the first direction of the transverse sub-retaining wall 75 to form a receding gap, and the transverse sub-retaining wall 75 is arranged in the receding gap; and the depression 73 comprises a transverse sub-retaining wall 75 and two inclined sub-retaining walls 77, the transverse sub-retaining wall 75 is arranged close to the alignment film 50, the two inclined sub-retaining walls 77 are positioned on the side, facing the sealant 30, of the transverse sub-retaining wall 75, the two inclined sub-retaining walls 77 are oppositely arranged in a spaced mode along the first direction of the transverse sub-retaining wall 75 to form a receding gap, and the transverse sub-retaining wall 75 is arranged in the receding gap.

The first direction is the length direction of the transverse sub-retaining wall, and the liquid alignment film 30 material is blocked by the transverse sub-retaining wall 75 to prevent the liquid alignment film 30 material from coming into contact with the sealant 50. The inclined sub-retaining walls 77 have blocking and guiding effects, and the liquid alignment film 30 material is blocked and guided by the inclined sub-retaining walls 77, so that the backflow of the liquid alignment film 30 material is prevented. Therefore, the protrusions 71 and the depressions 73 formed by the transverse sub-retaining wall 75 and the inclined sub-retaining walls 77 can better block the flow of the liquid alignment film 30 material and prevent the backflow thereof. The protrusions 71 and the depressions 73 may be adjacently and alternately arranged, and may share the same inclined sub-retaining wall 77, thus simplifying the structural design.

Further, the inclination directions of two adjacent inclined sub-retaining walls 77 are opposite.

By making the inclination directions of two adjacent inclined sub-retaining walls 77 opposite, the blocking and guiding effects can be better realized.

In one embodiment of the present application, a direction perpendicular to the first direction is defined as a second direction, and an included angle $\alpha$ formed by the inclined sub-retaining walls 77 and the second direction is within the range of $0°\leq\alpha<90°$.

The second direction herein is the width direction of the transverse sub-retaining wall. When the included angle $\alpha$ is equal to 0 degree, the contact between the alignment film 30 liquid and the inclined sub-retaining walls (referred to as the inclined sub-retaining wall herein just to distinguish it from the transverse sub-retaining wall, it should be understood that the inclined sub-retaining wall can be referred to as vertical sub-retaining wall) will be reduced in the flowing process.

The included angle $\alpha$ is set to an acute angle, i.e., the angle is set to be $0°<\alpha<90°$, in the flowing direction of the alignment film 30 liquid, the alignment film 30 liquid can be better guided when a protrusion 71 is formed. When a depression 73 is formed, a larger space for storing the alignment film 30 liquid can be formed while better guiding the alignment film 30 liquid.

Further, the inclination angles of two adjacent inclined sub-retaining walls 77 are the same. This facilitates processing and design, and the inclination angle may be optionally set to be 45 degrees.

Referring to FIG. 3, in one embodiment of the present application, in the protrusions 71, the vertical distance H1 between the highest point of the inclined sub-retaining walls 77 and the plane where the lower surface of the transverse sub-retaining wall 75 is located is within the range of 0 $\mu m < H1 \leq 100$ $\mu m$; and/or in the depressions 73, the vertical distance H2 between the lowest point of the inclined sub-retaining walls 77 and the plane where the upper surface of the transverse sub-retaining wall 75 is located is within the range of 0 $\mu m < H2 \leq 100$ $\mu m$.

That is, in the protrusions 71, a gap is formed between the highest point of the inclined sub-retaining walls 77 and the plane where the lower surface of the transverse sub-retaining wall 75 is located, and the gap should not be too large, which will cause much alignment film 30 liquid to flow through the space between the inclined sub-retaining walls 77 and the transverse sub-retaining wall 75. For example, the gap may be set to be 1 $\mu m$, 10 $\mu m$, 15 $\mu m$, 20 $\mu m$, 30 $\mu m$, 40 $\mu m$, 50 $\mu m$, 60 $\mu m$, 70 $\mu m$, 80 $\mu m$, 90 $\mu m$ and 100 $\mu m$.

Referring to FIG. 3, in one embodiment of the present application, the length L1 of one of the sub-retaining walls ranges from 10 $\mu m$ to 500 $\mu m$.

The length of the sub-retaining walls should not be too long, which will cause the alignment film 30 liquid to flow back after making contact with the sub-retaining walls and affect the display of the active area. Of course, the sub-retaining walls should not be too short, which will cause a failure to effectively block the alignment film 30 liquid, so that the alignment film 30 liquid makes contact with the sealant 50, affecting the bonding performance of the sealant 50. Besides, the space for arrangement needs to be considered too. Therefore, the length of the sub-retaining walls is set to be 10 $\mu m$ to 500 $\mu m$, such as 10 $\mu m$, 20 $\mu m$, 50 $\mu m$, 80 $\mu m$, 100 $\mu m$, 150 $\mu m$, 200 $\mu m$, 300 $\mu m$, 400 $\mu m$ and 500 $\mu m$.

In one embodiment of the present application, the width of the sub-retaining walls ranges from 5 $\mu m$ to 50 $\mu m$.

The sub-retaining walls should not be too wide, or else they will occupy too much space, nor too narrow, as this will cause inconvenience to processing and design. Therefore, the width of the sub-retaining walls is set to be 5 µm to 50 µm, such as 5 µm, 10 µm, 15 µm, 20 µm, 30 µm, 40 µm and 50 µm. The sub-retaining walls can be set to have the same width or different widths as needed.

The present application further provides a display device comprising a display panel 100, the specific structure of which can be understood with reference to the foregoing embodiments; adopting all the technical solutions of the foregoing embodiments, the display device has all the beneficial effects brought by the technical solutions of the foregoing embodiments, and is not redundantly described here in detail. The display device may be an LCD TV, a mobile terminal (such as a smart phone, a tablet computer and a handheld PDA) or a notebook computer.

The above mentioned is only the alternative embodiment of the present application, which does not limit the patent scope of the present application, and any equivalent structure transformation made by using the specification and the drawings of the present application or direct/indirect applications in other related technical fields should be contained in the scope of patent protection in a similar way.

What is claimed is:

1. A display panel, comprising:
    a substrate, comprising an active area and a non-display area surrounding the active area;
    an alignment film, arranged in the active area;
    a sealant, arranged in the non-display area; and
    a retaining wall, arranged between the alignment film and the sealant, the retaining wall comprising a plurality of sections of sub-retaining walls which are arranged at intervals to form protrusions protruding towards the alignment film and depressions depressing away from the alignment film.

2. The display panel according to claim 1, wherein one of the protrusions comprises a transverse sub-retaining wall and two inclined sub-retaining walls, the transverse sub-retaining wall is arranged close to the alignment film, the two inclined sub-retaining walls are positioned on the side, facing the sealant, of the transverse sub-retaining wall,
    the two inclined sub-retaining walls are oppositely arranged in a spaced mode along a first direction of the transverse sub-retaining wall to form a receding gap, and the transverse sub-retaining wall is arranged in the receding gap; and
    one of the depressions comprises a transverse sub-retaining wall and two inclined sub-retaining walls, the transverse sub-retaining wall is arranged close to the sealant, the two inclined sub-retaining walls are positioned on the side, facing the alignment film, of the transverse sub-retaining wall,
    the two inclined sub-retaining walls are oppositely arranged in a spaced mode along the first direction of the transverse sub-retaining wall to form a receding gap, and the transverse sub-retaining wall is arranged in the receding gap.

3. The display panel according to claim 2, wherein a direction perpendicular to the first direction is defined as a second direction, and an included angle α formed by the inclined sub-retaining walls and the second direction is within the range of 0°≤α<90°.

4. The display panel according to claim 2, wherein the inclination directions of two adjacent inclined sub-retaining walls are opposite.

5. The display panel according to claim 4, wherein the inclination angles of two adjacent inclined sub-retaining walls are the same.

6. The display panel according to claim 5, wherein the length L1 of one of the sub-retaining walls ranges from 10 µm to 500 µm.

7. The display panel according to claim 4, wherein a direction perpendicular to any of the transverse sub-retaining walls is defined as a vertical direction, and an included angle α formed by the inclined sub-retaining walls and the vertical direction is within the range of 0°≤α<90°.

8. The display panel according to claim 7, wherein the length L1 of one of the sub-retaining walls ranges from 10 µm to 500 µm.

9. The display panel according to claim 8, wherein all the sub-retaining walls have the same length.

10. The display panel according to claim 2, wherein in the protrusions, the vertical distance H1 between the highest point of the inclined sub-retaining walls and the plane where the lower surface of the transverse sub-retaining wall is located is within the range of 0 µm<H1≤100 µm.

11. The display panel according to claim 2, wherein in the depressions, the vertical distance H2 between the lowest point of the inclined sub-retaining walls and the plane where the upper surface of the transverse sub-retaining wall is located is within the range of 0 µm<H2≤100 µm.

12. The display panel according to claim 2, wherein in the protrusions, the vertical distance H1 between the highest point of the inclined sub-retaining walls and the plane where the lower surface of the transverse sub-retaining wall is located is within the range of 0 µm<H1≤100 µm; and
    in the depressions, the vertical distance H2 between the lowest point of the inclined sub-retaining walls and the plane where the upper surface of the transverse sub-retaining wall is located is within the range of 0 µm<H2≤100 µm.

13. The display panel according to claim 1, wherein the length L1 of one of the sub-retaining walls ranges from 10 µm to 500 µm.

14. The display panel according to claim 1, wherein the retaining wall is made from polystyrene.

15. The display panel according to claim 1, wherein the alignment film is made from polyimide.

16. The display panel according to claim 1, wherein the retaining wall is made from polystyrene, and the alignment film is made from polyimide.

17. A display device, comprising a display panel, wherein the display panel comprises:
    a substrate, comprising an active area and a non-display area surrounding the active area;
    an alignment film, arranged in the active area;
    a sealant, arranged in the non-display area; and
    a retaining wall, arranged between the alignment film and the sealant, the retaining wall comprising a plurality of sections of sub-retaining walls which are arranged at intervals to form protrusions protruding towards the alignment film and depressions depressing away from the alignment film.

18. The display device according to claim 17, wherein one of the protrusions comprises a transverse sub-retaining wall and two inclined sub-retaining walls, the transverse sub-retaining wall is arranged close to the alignment film, the two inclined sub-retaining walls are positioned on the side, facing the sealant, of the transverse sub-retaining wall,
    the two inclined sub-retaining walls are oppositely arranged in a spaced mode along a first direction of the transverse sub-retaining wall to form a receding gap, and the transverse sub-retaining wall is arranged in the receding gap; and one of the depressions comprises a transverse sub-retaining wall and two inclined sub-retaining walls, the transverse sub-retaining wall is arranged close to the sealant, the two inclined sub-retaining walls are positioned on the side, facing the alignment film, of the transverse sub-retaining wall, the two inclined sub-retaining walls are oppositely arranged in a spaced mode along the first direction of the transverse sub-retaining wall to form a receding gap, and the transverse sub-retaining wall is arranged in the receding gap.

19. A display device, comprising a display panel, wherein the display panel comprises:

a substrate, comprising an active area and a non-display area surrounding the active area, the substrate being at least one of an array substrate and a color film substrate;

an alignment film, arranged in the active area;

a sealant, arranged in the non-display area; and a retaining wall, arranged between the alignment film and the sealant, the retaining wall comprising a plurality of sections of sub-retaining walls which are arranged at intervals to form protrusions protruding towards the alignment film and depressions depressing away from the alignment film;

and all the sub-retaining walls have the same length.

* * * * *